(No Model.)

G. D. MOFFAT & R. W. HUSS.
PNEUMATIC TIRE.

No. 470,070. Patented Mar. 1, 1892.

Witnesses
Raymond H. Barnes.
William H. Shipley.

Inventors:
G. D. Moffat
R. W. Huss
By P. T. Dodge
Attorney

UNITED STATES PATENT OFFICE.

GEORGE D. MOFFAT AND RUDOLPH W. HUSS, OF CHICAGO, ILLINOIS.

PNEUMATIC TIRE.

SPECIFICATION forming part of Letters Patent No. 470,070, dated March 1, 1892.

Application filed August 21, 1891. Serial No. 403,298. (No model.)

*To all whom it may concern:*

Be it known that we, GEORGE D. MOFFAT and RUDOLPH W. HUSS, of Chicago, county of Cook and State of Illinois, have invented a new and useful Improvement in Pneumatic Tires, of which the following is a specification.

Our invention has reference to the hollow elastic tires, which are distended by air or other fluid confined therein.

These tires as ordinarily used upon bicycles and other like vehicles are attended with many advantages, but are open to the serious objection that they are readily and frequently punctured in passing over sharp obstacles, the result being the escape of the air and the collapse of the tire. The aim of our invention is to overcome this difficulty and to provide a tire of such character that, although it may be punctured, the opening will automatically close and prevent the escape of the air. To this end we construct our tire in such manner that when inflated the rubber or other material is under compression, so that if an opening be formed therethrough the walls will immediately close together upon the withdrawal of the puncturing body.

Our invention may be carried into effect in various forms; but in the accompanying drawings we have represented that construction which we find best adapted for general use.

Figure 1:
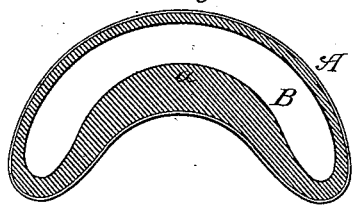
Figure 2:
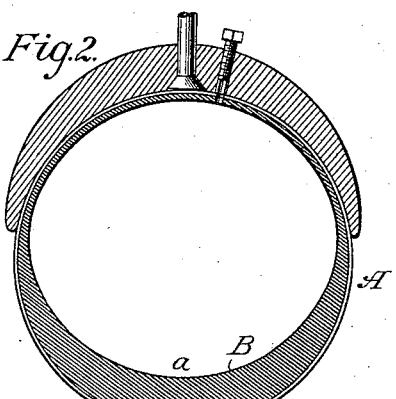

In the accompanying drawings, Figure 1 represents our tire in its original form before its inflation. Fig. 2 is a cross-section of the same as it appears when inflated for use. Figs. 3, 4, 5, and 6 are modifications.

The tire is made so that when inflated it is preferably of a circular form in cross-section; but the sectional form may be modified.

The tire consists of an external jacket or covering A, of canvas, linen, or similar material, and an internal tubular body B, of rubber or similar highly-elastic material, which is preferably made, as shown, of much greater thickness on the outer side or periphery than it is on the inner side next to the rim or felly of the wheel.

The tire is constructed in the first instance of a tubular concavo-convex form, as shown in cross-section in Fig. 1, the thickened portion of the rubber lying on the concave side. When the tire is expanded by the introduction of air or gas under suitable pressure, as in other pneumatic tires, the external jacket prevents the stretching or lengthening of the outer surface, and consequently the thickened body of rubber *a*, reversing its curvature and being shortened on the inner surface, is subjected on the inner surface to a very marked compression. In other words, the tire when expanded for use, as shown in Fig. 2, is held against abnormal expansion by the external jacket, which holds the thickened body of rubber under compression. If, therefore, a stone, a nail, or other foreign body be thrust through the tire from the outside and then withdrawn, the rubber under compression will immediately close the opening.

The essence of our invention lies in keeping the rubber or other elastic body of the tubular tire under compression, so that the walls of a hole formed therein will have a tendency to close together instead of a tendency to separate, as in ordinary tires, in which the rubber is under tension instead of under compression. It is to be understood, therefore, that our invention includes any inflated tire in which the rubber on the outer side is kept under pressure or compression.

Our tire is intended to be used in the ordinary grooved rim of a wheel or any other rim adapted to give it support.

Figure 3:
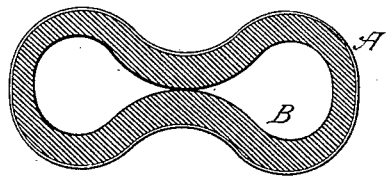
Figure 4:
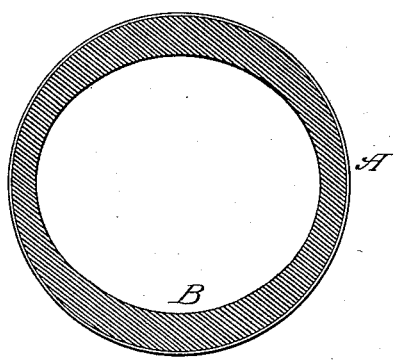

In Figs. 3 and 4 we have shown one modification of our tire. In its deflated condition, as shown in Fig. 3, it is concaved at its upper and lower sides, at which points it is thickened, so that when expanded to the form shown in Fig. 4 the rubber will be compressed at the inner surface both at the upper and lower sides of the tire. This construction would be of advantage in case a foreign object were caused to enter entirely through the tire to the rim of the wheel, as is sometimes the case.

Figure 5:
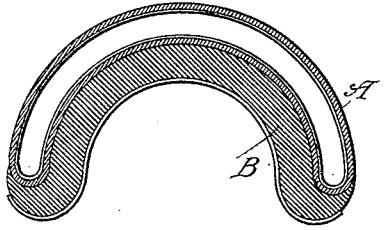
Figure 6:
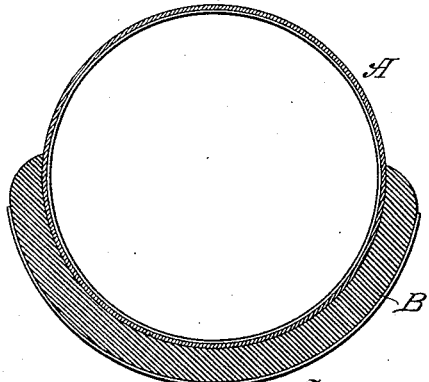

In Figs. 5 and 6 we have shown another modification. In this case the tire consists of a tube of rubber-covered linen, canvas, or other suitable material to contain the air or other fluid. It is provided on its lower side with a thickened section of rubber, on the outer surface of which is cemented a confining-strip of canvas. When in a deflated condition, the tire presents the form shown in Fig. 6. When expanded, as shown in Fig. 5, the inner surface of the section of rubber will be compressed, the stretching or lengthening of the outer surface being prevented by its covering.

Having thus described our invention, what we claim is—

1. In a pneumatic tire, the combination of a pliable non-extensible outer layer and an internal body of rubber seated against the outer layer and maintained under compression, whereby the automatic closure of punctures therein is secured.

2. A pneumatic tire consisting of an external jacket of canvas or similar material, an internal body of rubber under compression, and a confined body of air.

3. The improved pneumatic tire consisting of the outside pliable non-stretching material and an internal body of rubber thicker at the outer than the inner side of the tire and held under compression.

4. The improved pneumatic tire having in its deflated condition a tubular concavo-convex form, with its body thickened on the concave side.

In testimony whereof we hereunto set our hands, this 17th day of August, 1891, in the presence of two attesting witnesses.

GEO. D. MOFFAT.
RUDOLPH W. HUSS.

Witnesses:
CHARLES A. PERCY,
V. W. JOHNSON.